United States Patent [19]

Neefe

[11] Patent Number: 4,541,969
[45] Date of Patent: Sep. 17, 1985

[54] METHOD OF MAKING TORIC SPIN CAST LENSES

[76] Inventor: Charles W. Neefe, Box 429, 811 Scurry St., Big Spring, Tex. 79720

[21] Appl. No.: 677,867

[22] Filed: Dec. 3, 1984

[51] Int. Cl.⁴ ............................................. B29D 11/00
[52] U.S. Cl. .................................... 264/1.4; 264/2.1; 264/311; 425/808
[58] Field of Search ............... 264/2.1, 1.1, 310, 311, 264/1.4; 425/808

[56] References Cited

U.S. PATENT DOCUMENTS

| 2,525,664 | 10/1950 | Gadsby et al. | 425/808 |
| 3,699,089 | 10/1972 | Wichterle | 264/2.1 |
| 3,822,089 | 7/1974 | Wichterle | 264/2.1 |
| 4,378,953 | 4/1983 | Winn | 264/2.1 |
| 4,424,175 | 1/1984 | Neefe | 425/808 |

Primary Examiner—James Lowe

[57] ABSTRACT

A method of spin casting toric meniscus concave surfaces by displacing the axis of rotation away from the perpendicular in synchronized movement with the molds rotation. The speed of mold rotation and the movement from the perpendicular are synchronized to displace the liquid lens monomer in two opposite directions during polymerization. A toric concave meniscus is thus formed and the liquid monomer is allowed to thicken and polymerize to form a solid lens having a toric concave surface.

16 Claims, 9 Drawing Figures

METHOD OF MAKING TORIC SPIN CAST LENSES

This invention relates to a method of preparing corneal contact lenses and more particularly toric contact lenses essentially consisting of soft hydrogels of organic polymers.

Difficulties were encountered heretofore in the manufacture of toric contact lenses from soft polymeric hydrogels. The polymerized material is too soft when in the swollen state to permit surface finishing, and brittle when dried. It is necessary that contact lenses be made from the hydrogels by polymerizing a suitable starting material in a mold whose surface configuration determines the lens surface.

The art of spin casting contact lenses has been in use for nineteen years. The principal value of spin casting is its low cost and high production. The disadvantages are the lenses are not spherical and the aspheric surface is of a shape that increases spherical aberration. The exact shape is most difficult to describe due to its being formed by several forces including centrifugal force, surface tension, viscosity of the liquid and radius of the concave mold.

In spin casting the two optical surfaces of the lens are formed simultaneously during polymerization. The outer lens surface is shaped by contact with the smooth mold surface, and the inner lens surface is shaped by the joint action of centrifugal forces, gravity and of surface tension on the polymerization mixture. Since the mold diameter is normally between 8 and 14 millimeters, the influence of surface tension on the ultimate lens shape is quite substantial.

The instant invention is concerned with a method and apparatus for making contact lenses which may have concave surfaces other than approximately paraboloidal surfaces. A more specific object of this invention is the provision of a method and of apparatus for preparing soft and resilient contact lenses having the necessary toric concave configuration for correcting astigmatism. Contact lenses suitable for this purpose were heretofore prepared by grinding and polishing a blank consisting of a hard transparent xerogel polymer and hydrating to form the soft and resilient hydrogels of sparingly crosslinked synthetic polymers which have many known advantages over the hard plastic lenses.

PRIOR ART

Wichterle U.S. Pat. No. 4,256,369 describes a soft toric contact lens having a menescus concave surface and a toric convex lens surface which is molded against a toric concave mold.

Neefe U.S. Pat. No. 4,179,484 describes a method of making toric lenses having a molded toric concave surface and a lathe cut and polished spherical convex surface.

Wichterle U.S. Pat. No. 3,361,858 describes a method of molding lenses and removing the swelling agent before shaping the xerogel lens and rehydrating to form a toric hydrogel lens.

STATE OF THE ART

Soft spin cast lenses cannot provide acceptable vision to patients having 1.00 diopter or more cornea astigmatism. This is because soft lenses conform to the curvature of the cornea and the corneal astigmatism is then present on the convex surface of the soft contact lens. Hard rigid lenses do not conform to the shape of the cornea and the tear layer between the spherical lens and the toric cornea neutralizes the corneal astigmatism. This desirable effect does not occur with soft contact lenses. The present invention discloses a method of spin casting lenses with a toric concave surface to match toric convex corneal surface and neutralize the corneal astigmatism.

IN THE DRAWINGS

THE TORIC LENS IS MADE AS FOLLOWS

Figure 1:
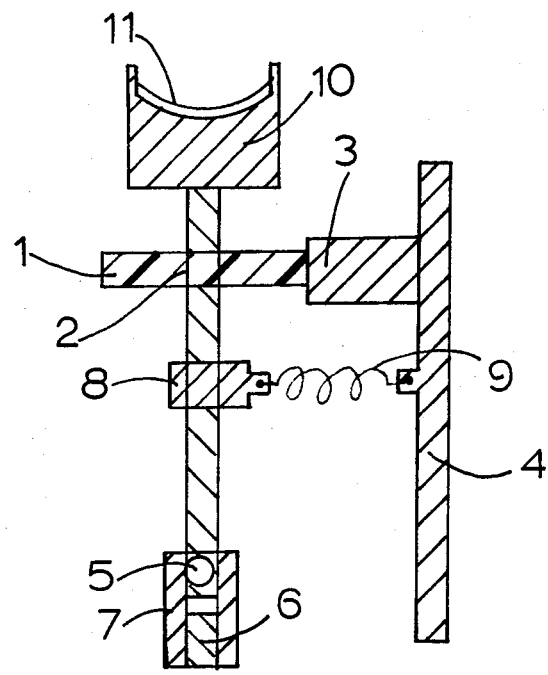
FIG. 1 shows the lens mold and the oscillating machine in section.

In a lens mold having its rotational axis toward the earth's center the equation for the spinning liquid surface can be expressed in a cylindrical coordinate system as:

$$z(r) = \frac{w^2 r^2}{2g} + \frac{o}{pg}\left[\frac{1}{R_s} + \frac{1}{R_t}\right]$$

where, w is rotational speed in radians per second, g is gravitational acceleration, o is surface tension, p is liquid density, $R_s$ is surface sagittal radius of curvature and $R_t$ is surface tangential radius of curvature.

If the axis of rotation is tilted away from the perpendicular a different surface will evolve. This new surface will extend further upward as the sides of the lens mold resulting in a shorter concave radius of curvature.

A smooth evenly distributed concave surface is produced in the rotating lens mold as the viscosity of the polymerizing liquid monomer increases. The final lens surface is uniform and of good optical quality having a shorter concave radius of curvature. Cast plastic tubing is made by polymerizing liquid monomer in a horizontal rotating cylinder. A smooth even plastic coating is formed on the inside of the rotating cylinder after the monomer is allowed to polymerize.

DESCRIPTION OF THE INVENTION

In order to produce a spin cast concave toric surface the off perpendicular movement of the axis of rotation is synchronized with the rotation of the spin cast lens mold. The maximum off perpendicular movement must occur at two positions of the rotation located 180° degrees apart and synchronized with the rotation of the spin cast lens and mold. A shorter concave radius of curvature will be present in direction of movement away from the perpendicular and a longer concave radius of curvature will be present through the direction of no movement away from the perpendicular. The axis of rotation always remains at the geometric center of the concave lens mold. The inclination of the axis of rotation away from the perpendicular is controlled as to the distance of movement from the perpendicular, the speed of the movement, dwell time as maximum derivation from perpendicular, dwell time at perpendicular and the choice of movement occuring twice in the same direction from perpendicular with each revolution or once in each of two opposite directions with each revolution. The revolutions per minute used in spin casting are slow ranging from 40 to 500 revolutions per minute. The speed is changed during the polymerization cycle starting at a slow speed of 40 to 60 RPM and increased to the final speed as polymerization proceeds. The final speed controls the lens refractive power. The distance of displacement to produce a given amount of toricity in diopters is dependent on the speed of rotation and lens curvature. Displacements from perpendicular of 0.02 millimeters to 3.0 millimeters have been found useful in making soft contact lenses. Examples of the lens monomer mixtures used are as follows:

| (1) Ethylene glycol monomethacrylate | 64.8% |
|---|---|
| Diethylene glycol monomethacrylate | 7.056% |
| Ethylene glycol dimethacrylate | 0.144% |
| Water | 20.9% |
| Ammonium persulfate | 1.1% |
| 2-dimethylaminoethyl acetate | 6.0% |
| (2) Ethylene glycol monomethacrylate | 54.7% |
| Diethylene glycol monomethacrylate | 17.2% |
| Diethylene glycol dimethacrylate | 0.6% |
| Ammonium persulfate | 1.1% |
| Dimethylaminoethyl acetate | 5.8% |
| Water | 20.6% |
| (3) Methylmethacrylate | 96.75% |
| Ethylenedimethacrylate | 3.00% |
| Benzoyl Peroxide | .25% |

THE METHOD IS CARRIED OUT AS FOLLOWS

Figure 2:
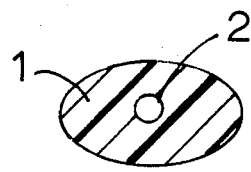
FIG. 2 shows an elliptical cam centered.

The lens mold 10 FIG. 1 is rotated around its geometric center. A cam 1 FIG. 1 is attached to the drive shaft 2 FIG. 1 and is rotated by the universal joint 7 FIG. 1 the shaft 2 FIG. 1 may pivot on bearing 5 FIG. 1. The power shaft 6 FIG. 1 drives the universal joint 7 FIG. 1. The cam 1 FIG. 1 is held against the locating bar 3 FIG. 1 by the spring 9 FIG. 1 attached between the bushing 8 FIG. 1 and to the support 4 FIG. 1. Movement from the perpendicular is provided by cam 1 FIG. 1 turning against locating bar 3 FIG. 1. The cam may have several shapes, FIG. 2 an elliptical cam providing movement in the same direction from perpendicular twice with each revolution.

Figure 3:
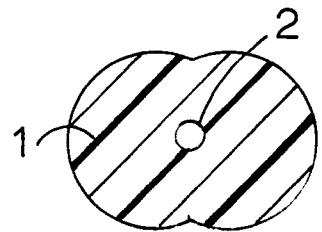
FIG. 3 shows a cam with two circular lobes centered.
Figure 4:
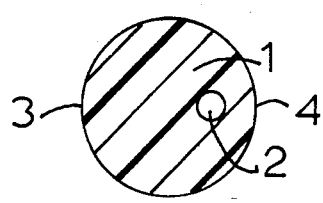
FIG. 4 shows a circular cam decentered.

A twin lobed circular cam FIG. 3 which also provides movement in the same direction twice on each revolution. The dwell time as maximum derivation from perpendicular is greater. FIG. 4, a circular cam 1 FIG. 4 with an off-center shaft 2 FIG. 4 providing movement from perpendicular in two opposite directions on each revolution with longer dwell time at maximum derivation at points 3 and 4 and cam 1 FIG. 4.

Figure 5:
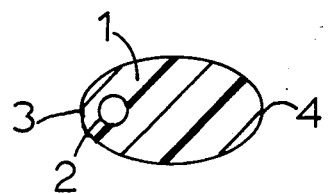
FIG. 5 shows an elliptical cam decentered.

An elliptical cam 1 FIG. 5 with off center shaft 2 FIG. 5 provides movement in two opposite directions from perpendicular on each revolution with a minimum dwell of time at maximum derivation 3 and 4 FIG. 5. Maximum dwell time is allowed at the perpendicular. The monomer fluid dynamics are greatest with an elliptical cam and consequently the fluid inertial forces are also greatest.

Figure 6:
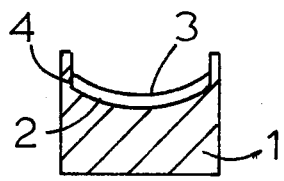
FIG. 6 shows the lens in the mold in section 90° from the oscillation.

When the lens spin cast mold 1 FIG. 6 is rotating in the perpendicular position the lens is formed between the concave mold surface 2 FIG. 6 and the spinning liquid meniscus surface 3 FIG. 6 and contained by the retaining cylinder wall 4 FIG. 6.

Figure 7:
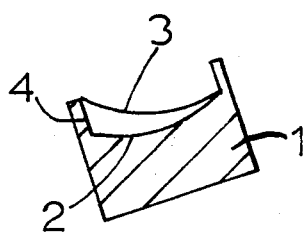
FIG. 7 shows the lens mold at maximum forward oscillation in section.
Figure 8:
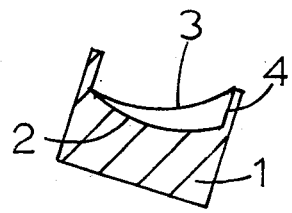
FIG. 8 shows the lens mold a maximum rearward oscillation in section.

When the rotational axis of mold 1 FIG. 7 is moved away from the perpendicular the liquid lens is formed between the concave mold surface 2 FIG. 7 and the spinning lens meniscus 3 FIG. 7 and retained by cylinder wall 4 FIG. 7. If the mold were maintained at the off perpendicular position and not synchronized with the rotation, the thickening liquid would be dispersed equally around the periphery of the lens mold. This is not the case if the movement away from and back to the perpendicular is synchronized with the mold rotation. The liquid lens monomer turns with the mold surface and rises only on two opposite sides of the cylinderical retaining wall 4 FIGS. 7 and 8. The cycle is as follows: (1) The rotating mold 1 FIG. 6 with the rotating liquid lens monomer forming concave surface 3 FIG. 6. (2) The axis of mold rotation moves to the left of perpendicular FIG. 7 and the spinning liquid lens monomer rises on the left side of the mold retaining wall 4 FIG. 7. (3) The rotating lens mold moves back to the perpendicular FIG. 6 and the liquid lens monomer moves back to the surface 3 FIG. 6. (4) The axis of rotation moves to the right of the perpendicular FIG. 8. The liquid lens monomer moves upward on the right side of the retaining wall 4 FIG. 8 and the liquid lens surface 3 FIG. 8 again rises to align itself with the perpendicular.

Figure 9:
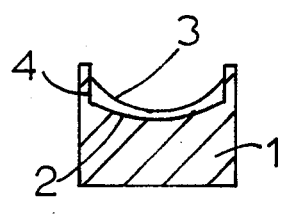
FIG. 9 shows the lens in the mold through the direction of oscillation in section.

Polymerization is allowed to proceed and a thickening of the liquid lens monomer occurs. With increased monomer thickening the speed of rotation may now be increased to achieve the desired refractive lens power and movement up and down the sides as the retaining wall 4 FIG. 9 decreases. As polymerization continues, a solid lens is formed having a shorter radius 3 FIG. 9 through the direction of movement away from the perpendicular and a longer radius 3 FIG. 6 through the direction 90° removed which was not moved away from the perpendicular. A toric meniscus concave surface has been produced by spin casting.

Precise control of the polymerization process may be obtained by the use of an ultraviolet sensitive catalyst such as azobis methylpropionitrile or Benzoin methyl ether (BME). An inert atmosphere such as nitrogen or carbon dioxide is used to prevent the atmospheric oxygen from acting as a polymerization inhibitor. The amount of ultraviolet light can be adjusted to control the rate of polymerization.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

I claim:

1. A method of making spin cast lenses having a toric concave surface by the steps of providing a concave lens mold having a peripheral retaining ring extending above the concave optical mold surface, placing a selected liquid lens monomer in the concave lens mold, rotating the concave lens mold around the optical axis of the spin cast lens, aligning the axis of mold rotation and the lens optical axis to the perpendicular position, displacing the axis of mold rotation from the perpendicular two times during each revolution of the lens mold, synchronizing the displacement from perpendicular to occur at two rotational positions separated by 180 degrees of lens mold rotation, the selected liquid lens monomer is allowed to move upward on the peripheral retaining ring surrounding the concave optical mold surface at the rotational positions displaced from the perpendicular, and a shorter concave radius of curvature is present through the directions of monomer movement, allowing the rotating liquid lens monomer to polymerize and form a spin cast lens having a toric concave surface.

2. A method of making spin cast lenses having a toric concave surface by the steps of providing a concave spin cast lens mold, placing a selected liquid lens monomer in the concave lens mold, rotating the concave lens mold around its geometric center, aligning the axis of the lens mold rotation to the perpendicular position, displacing the rotational axis of the spin cast lens mold from the perpendicular, synchronizing the displacement from perpendicular to occur at the same two rotational positions on each revolution and separated by 180 degrees of mold rotation, allowing the selected liquid lens monomer to move toward the positions displaced from the perpendicular and provide a shorter concave radius of curvature through the direction of mold displacement from perpendicular, allowing the rotating liquid lens monomer to polymerize to form a toric concave spin cast lens surface.

3. A method of making spin cast lenses having a toric concave optical surface by the steps of providing a concave spin casting mold, placing a selected liquid lens monomer in the concave spin cast mold, rotating the spin casting concave mold around its geometric center, displacing the spin casting mold 0.02 millimeters to 3.0 millimeters from the central rotational position two times during each revolution, the two displacements occuring on each revolution being positioned one hundred and eighty degrees one from the other, providing a shorter concave radius of curvature on the liquid monomer concave surface between the two positions of displacement from the central rotational position, allowing the liquid lens monomer to polymerize to form a spin cast lens having a toric concave surface.

4. A method as in claim 1 wherein the speed of mold rotation increases as polymerization of the lens monomer proceeds.

5. A method as in claim 2 wherein the speed of mold rotation increases as polymerization of the lens monomer proceeds.

6. A method as in claim 3 wherein the speed of mold rotation increases as polymerization of the lens monomer proceeds.

7. A method as in claim 1 wherein the displacement from perpendicular is from 0.02 millimeters to 3.0 millimeters.

8. A method as in claim 2 wherein the displacement from perpendicular is from 0.02 millimeters to 3.0 millimeters.

9. A method as in claim 2 wherein a peripheral retaining ring extends above the concave surface of the concave spin casting mold.

10. A method as in claim 3 wherein a peripheral retaining ring extends above the concave surface of the concave spin casting mold.

11. A method as in claim 1 wherein the displacement of the rotating lens mold is synchronized and controlled by a rotating cam.

12. A method as in claim 2 wherein the displacement of the rotating lens mold is synchronized and controlled by a rotating cam.

13. A method as in claim 3 wherein the displacement of the rotating lens mold is synchronized and controlled by a rotating cam.

14. A method as in claim 1 wherein ultraviolet light is used to polymerize the monomer and the rate of polymerization is controlled by the quantity of ultraviolet light reaching the lens monomer.

15. A method as in claim 2 wherein ultraviolet light is used to polymerize the monomer and the rate of polymerization is controlled by the quantity of ultraviolet light reaching the lens monomer.

16. A method as in claim 3 wherein ultraviolet light is used to polymerize the monomer and the rate of polymerization is controlled by the quantity of ultraviolet light reaching the lens monomer.

* * * * *